US011178501B2

(12) United States Patent
Wang et al.

(10) Patent No.: US 11,178,501 B2
(45) Date of Patent: Nov. 16, 2021

(54) METHODS, DEVICES, AND COMPUTER-READABLE MEDIUM FOR MICROPHONE SELECTION

(71) Applicant: Beijing Xiaomi Mobile Software Co., Ltd., Beijing (CN)

(72) Inventors: Nannan Wang, Beijing (CN); Chiafu Yen, Beijing (CN); Dawei Xiong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 356 days.

(21) Appl. No.: 15/634,258

(22) Filed: Jun. 27, 2017

(65) Prior Publication Data

US 2018/0054686 A1 Feb. 22, 2018

(30) Foreign Application Priority Data

Aug. 16, 2016 (CN) .......................... 201610680489.0

(51) Int. Cl.
*H04R 29/00* (2006.01)
*G01H 3/00* (2006.01)
(Continued)

(52) U.S. Cl.
CPC .......... *H04R 29/005* (2013.01); *G01H 3/005* (2013.01); *H04R 1/406* (2013.01); *H04R 3/005* (2013.01); *H04R 2499/11* (2013.01)

(58) Field of Classification Search
CPC . H04R 29/00; H04R 1/40; H04R 3/00; H04R 29/005; H04R 3/005; H04R 1/406; H04R 2499/11; G01H 3/005
See application file for complete search history.

(56) References Cited

U.S. PATENT DOCUMENTS 3,978,282 A * 8/1976 Fulton, Jr. ................ H04B 3/46
178/69 G
4,032,716 A * 6/1977 Allen ......................... H04J 1/16
370/252

(Continued)

FOREIGN PATENT DOCUMENTS

CN 101816135 A 8/2010
CN 103959201 A 7/2014
(Continued)

OTHER PUBLICATIONS

Extended European Search Report issued in European Patent Application No. 17159648.9, from the European Patent Office, dated Sep. 13, 2017.

*Primary Examiner* — Isam A Alsomiri
*Assistant Examiner* — Amie M Ndure
(74) *Attorney, Agent, or Firm* — Finnegan, Henderson, Farabow, Garrett & Dunner, L.L.P.

(57) ABSTRACT

A method for microphone selection, applied in a mobile device having at least two microphones, the method includes: transmitting, by using an ultrasonic transmitter of the mobile device, first ultrasonic waves within a testing box, wherein the first ultrasonic waves are transmitted with a predefined transmission strength and at different frequencies selected from a predefined frequency range; acquiring, by using each of the at least two microphones to receive second ultrasonic waves reflected from the first ultrasonic waves within the testing box, frequency response values of the second ultrasonic waves received by each of the at least two microphones; and determining one of the at least two microphones which has a highest frequency response value, as a microphone for receiving ultrasonic waves for the mobile device.

9 Claims, 8 Drawing Sheets

(51) Int. Cl.
 *H04R 1/40* (2006.01)
 *H04R 3/00* (2006.01)

(56) References Cited

U.S. PATENT DOCUMENTS

| | | | | |
|---|---|---|---|---|
| 9,160,407 | B2* | 10/2015 | Stelle, IV | H04N 17/004 |
| 9,363,386 | B2* | 6/2016 | Li | H04M 9/082 |
| 10,199,849 | B1* | 2/2019 | Bell | H04W 4/80 |
| 2002/0095686 | A1* | 7/2002 | Shi | H04N 17/00 |
| | | | | 725/107 |
| 2006/0248565 | A1* | 11/2006 | Shimp | H04N 7/106 |
| | | | | 725/123 |
| 2006/0274858 | A1* | 12/2006 | May | H03H 17/0621 |
| | | | | 375/340 |
| 2007/0223736 | A1* | 9/2007 | Stenmark | H04R 3/04 |
| | | | | 381/103 |
| 2008/0033698 | A1* | 2/2008 | Stelle | G01R 31/025 |
| | | | | 702/189 |
| 2010/0150360 | A1 | 6/2010 | Beaucoup | |
| 2012/0257661 | A1* | 10/2012 | Murphy | G01R 31/021 |
| | | | | 375/224 |
| 2013/0301391 | A1* | 11/2013 | Altman | G01S 15/003 |
| | | | | 367/100 |
| 2015/0077129 | A1* | 3/2015 | Zinevich | H04N 17/004 |
| | | | | 324/512 |
| 2017/0238109 | A1 | 8/2017 | Gong | |

FOREIGN PATENT DOCUMENTS

| | | |
|---|---|---|
| WO | WO 2007/097157 A1 | 8/2007 |
| WO | WO 2014/092472 A1 | 6/2014 |
| WO | WO 2015/131706 A1 | 9/2015 |
| WO | WO 2015/154424 A1 | 10/2015 |

* cited by examiner

METHODS, DEVICES, AND COMPUTER-READABLE MEDIUM FOR MICROPHONE SELECTION

CROSS-REFERENCE TO RELATED APPLICATION

This application is based upon and claims priority to Chinese Patent Application No. 201610680489.0, filed on Aug. 16, 2016, the entire contents of which are incorporated herein by reference.

FIELD

The present disclosure generally relates to ultrasound application technologies, and more particularly, to methods, devices and computer-readable medium for microphone selection.

BACKGROUND

Generally, a mobile device, such as a smart device, having an ultrasonic function may use an ultrasonic transmitter in the mobile device to transmit an ultrasonic wave and use a microphone on the mobile device to receive the reflected ultrasound wave, when performing the ultrasonic function.

Currently, the mobile device may be configured with two or more microphones. At a stage of factory setting, a microphone on the mobile device may be fixedly selected as a receiver for receiving ultrasound waves. For example, if the mobile device is configured with three microphones in a row, then one in the middle of the three microphones is selected as the receiver for receiving ultrasound waves.

However, due to limitations of hardware conditions, the microphone selected for receiving ultrasonic waves is not always the best receiver for receiving ultrasound waves, compared with other microphones not selected.

SUMMARY

According to a first aspect of the present disclosure, there is provided a method for microphone selection, applied in a mobile device having at least two microphones, the method comprising: transmitting, by using an ultrasonic transmitter of the mobile device, first ultrasonic waves within a testing box, wherein the first ultrasonic waves are transmitted with a predefined transmission strength and at different frequencies selected from a predefined frequency range; acquiring, by using each of the at least two microphones to receive second ultrasonic waves reflected from the first ultrasonic waves within the testing box, frequency response values of the second ultrasonic waves received by each of the at least two microphones; and determining one of the at least two microphones which has a highest frequency response value, as a microphone for receiving ultrasonic waves for the mobile device.

According to a second aspect of the present disclosure, there is provided a method for microphone selection, applied in a mobile device having at least two microphones, the method comprising: transmitting, by using an ultrasonic transmitter of the mobile device, a first ultrasonic wave with a predefined transmission strength and a predefined frequency; acquiring, by using each of the at least two microphones to receive a second ultrasonic wave reflected from the first ultrasonic wave, a frequency response value of the second ultrasonic wave received by each of the at least two microphones; comparing, for each of the at least two microphones, the acquired frequency response value of the microphone with a standard frequency response value of the microphone; and determining one of the at least two microphones which has a smallest difference value between the acquired frequency response value and the standard frequency response value, as a microphone for receiving ultrasonic waves for the mobile device.

According to a third aspect of the present disclosure, there is provided a mobile device, comprising: a processor; at least two microphones coupled to the processor; and a memory for storing instructions executable by the processor, wherein the processor is configured to: transmit, by using an ultrasonic transmitter of the mobile device, first ultrasonic waves within a testing box, wherein the first ultrasonic waves are transmitted with a predefined transmission strength and at different frequencies selected from a predefined frequency range; acquire, by using each of the at least two microphones to receive second ultrasonic waves reflected from the first ultrasonic waves within the testing box, frequency response values of the second ultrasonic waves received by the at least two microphones; and determine one of the at least two microphones which has a highest frequency response value, as a microphone for receiving ultrasonic waves for the mobile device.

It is to be understood that both the forgoing general description and the following detailed description are exemplary only, and are not restrictive of the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to exemplary embodiments, examples of which are illustrated in the accompanying drawings. The following description refers to the accompanying drawings in which same numbers in different drawings represent same or similar elements unless otherwise described. The implementations set forth in the following description of exemplary embodiments do not represent all implementations consistent with the invention. Instead, they are merely examples of devices and methods consistent with aspects related to the invention as recited in the appended claims.

In exemplary embodiments, there are provided methods for selecting a microphone on a mobile device for receiving ultrasonic signals. In one exemplary embodiment, the microphone is selected before the mobile device leaves a factory. In another exemplary embodiment, the microphone is selected after the mobile device leaves the factory when a user operates the mobile device.

Figure 1A:
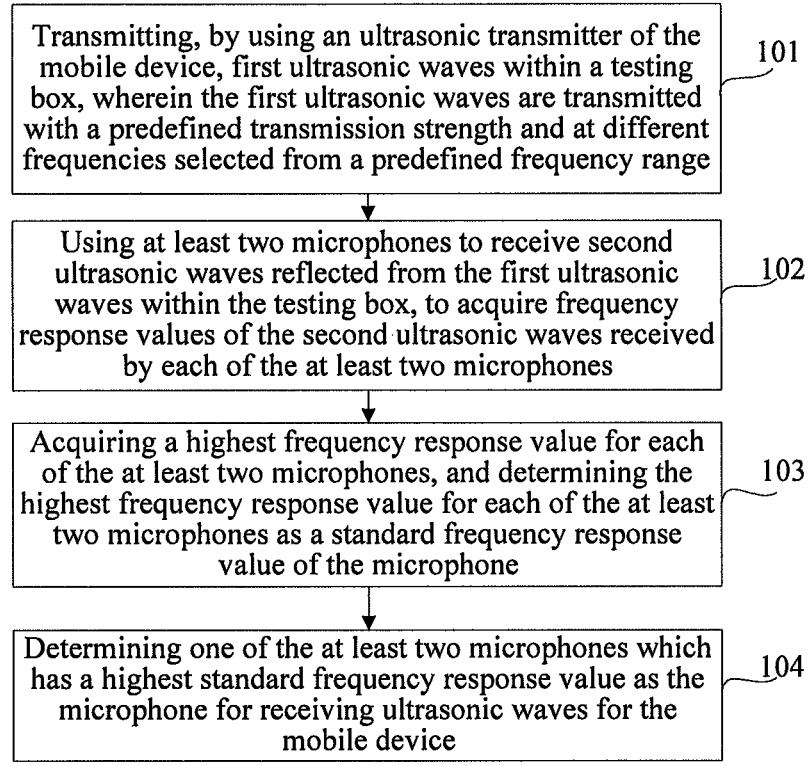
FIG. 1A is a flow chart of a method for microphone selection according to an exemplary embodiment.

FIG. 1A is a flow chart of a method 100 for microphone selection, according to an exemplary embodiment. For example, the method 100 may be applied in a mobile device having at least two microphones and before the mobile device leaves a factory. Referring to FIG. 1, the method 100 includes the following steps.

In step 101, first ultrasonic waves are transmitted within a testing box, by using an ultrasonic transmitter of the mobile device. The first ultrasonic waves are transmitted with a predefined transmission strength and at different frequencies selected from a predefined frequency range.

The ultrasonic transmitter may be a component in the mobile device which is dedicated for transmitting ultrasonic waves, and may also be a speaker on the mobile device.

For different mobile devices, each mobile device has its own optimal transmission frequency. These transmission frequencies generally fall within the predefined frequency range, for example, a range from 20 kHz to 50 kHz.

In exemplary embodiments, to make the mobile device transmit ultrasound waves at its own optimal transmission frequency, during a measurement stage before the mobile device leaves the factory, the mobile device may be controlled to transmit a frequency sweep signal within the predefined frequency range, i.e., transmit the first ultrasonic waves sequentially at the different frequencies in the predefined frequency range.

In the exemplary embodiment, one or more frequencies may be selected from the predefined frequency range in sequence, for example, the selected frequencies start from 20 kHz. For a selected frequency, the ultrasonic transmitter of the mobile device may transmit, with the predefined transmission strength, the first ultrasonic wave having the selected frequency within the testing box.

The predefined transmission strength may be a particular transmission strength configured for the mobile device. In general, the transmission strength is directly proportional to an initial amplitude of a transmitted ultrasonic wave, i.e., the stronger the transmission strength, the higher the initial amplitude of the transmitted ultrasonic wave. The transmission frequency usually will not be influenced by the transmission strength.

The testing box is capable of blocking audio signals from transmitting outside, to provide a proper testing environment for the mobile device. In the text box, the ultrasonic waves may be less influenced by other factors.

Due to influences caused by factors such as transmission medium, transmission medium temperature, transmission medium density, etc., a transmitted ultrasonic wave may be attenuated by a certain degree. Since the first ultrasonic waves are transmitted within the testing box, attenuation of the first ultrasonic waves is relatively small.

In step 102, the at least two microphones are used to receive second ultrasonic waves reflected from the first ultrasonic waves within the testing box, to acquire frequency response values of the second ultrasonic waves received by each of the at least two microphones.

Each of the at least two microphones may be controlled to receive the second ultrasonic waves reflected from the first ultrasonic waves within the testing box.

Figure 1B:
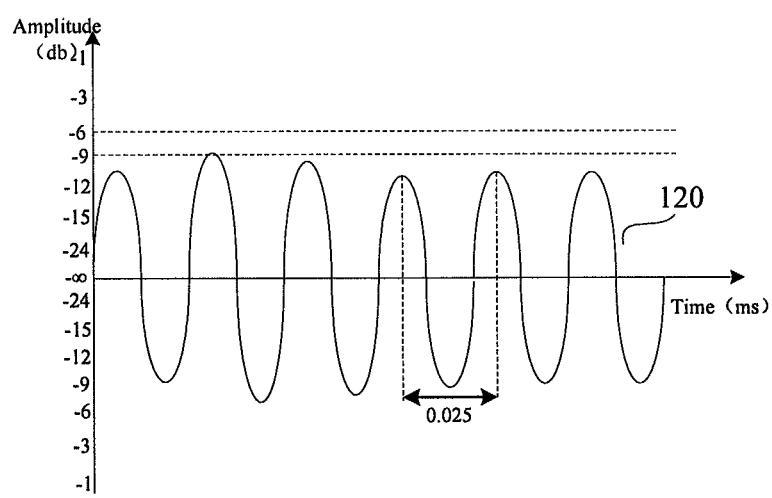
FIG. 1B is a schematic diagram of waveforms of a 40 kHz ultrasonic signal according to an exemplary embodiment.

For each of the second ultrasonic waves received by a microphone, a frequency response value may be determined to be a highest amplitude within periods of the second ultrasonic wave received by the microphone. As shown in FIG. 1B, after the transmission of a first ultrasonic wave, a microphone receives a reflected second ultrasonic wave 120. Due to influences of environment factors and the microphone, amplitudes of the second ultrasonic wave 120 in each period may be different. In the embodiment, the highest amplitude of the second ultrasonic wave 120 received by the microphone is determined as the frequency response value of the second ultrasonic wave 120 received by the microphone. In FIG. 1B, the second ultrasonic wave 120 has a frequency of 40 kHz as an example. If the transmitted first ultrasonic wave has a highest amplitude of −6 dB, then influenced by the environment, the received second ultrasonic wave 120 may have a highest amplitude of −9 dB. Accordingly, the frequency response value of the second ultrasonic wave 120 is −9 dB.

Because of the influences of environmental factors within the text box, after transmitted with the selected frequency, the first ultrasonic wave may have different degrees of attenuation in amplitude for each period. Accordingly, the second ultrasonic wave reflected back may have different amplitudes in different periods.

Since each microphone receives a second ultrasonic wave reflected back from the same first ultrasonic wave and different microphones may be constructed with different hardware elements, the frequency response value of the second ultrasonic wave received by each microphone may be influenced by hardware conditions of the microphones. That is to say, even though the first ultrasonic wave is the same and the first ultrasonic wave is transmitted in the same environment, the frequency response values of the second ultrasonic wave received by different microphones may be different.

In order to determine one of the microphones which has a minimum influence on the frequency response value, the frequency response values of the second ultrasonic wave received by each microphone are acquired.

In step 103, a highest frequency response value for each of the at least two microphones is acquired and the highest frequency response value for each of the at least two microphones is determined as a standard frequency response value of the microphone.

In exemplary embodiments, for each microphone, the mobile device may compare frequency response values of the second ultrasonic waves received by the microphone and determine a highest frequency response value of the second ultrasonic waves as the highest frequency response value of the microphone, different second ultrasonic waves corresponding to different frequencies.

Each time a frequency is selected from the predefined frequency range, each microphone may have its own frequency response value. Thus, for different frequencies selected within the predefined frequency range, each microphone may acquire its own highest frequency response value. The highest frequency response value of a microphone may be stored as a standard frequency response value of the microphone.

Each microphone's highest frequency response value may be stored as standard frequency response values in the mobile device. During an operation process after leaving the factory, the mobile device may also determine a preferred microphone based on the standard frequency response values of the microphones, as described below in FIG. 2.

In step 104, one of the at least two microphones which has a highest frequency response value may be determined as the microphone for receiving ultrasonic waves for the mobile device.

The higher standard frequency response value indicates that its corresponding microphone receives a smaller influence on the processing of a reflected ultrasonic wave. Thus, such microphone may be determined as a preferred microphone.

Before leaving the factory, if it is desired to determine a preferred microphone, one microphone having a highest frequency response value may be determined as the microphone for receiving ultrasonic waves. Accordingly, during an initialization process before leaving the factory, the microphone for receiving ultrasonic waves may be configured in the mobile device. Then the microphone configured for receiving ultrasonic waves may be used to receive ultrasonic waves during subsequent operations of the mobile device.

In one exemplary embodiment, another microphone which does not have the highest frequency response value may be configured to not receive ultrasonic waves.

In one exemplary embodiment, the frequency corresponding to the highest standard frequency response value may be determined as a predefined frequency of the mobile device, and the highest standard frequency response value may be determined as a standard frequency response value of the mobile device.

The standard frequency response value of the mobile device may be referred to when the mobile device is normally using ultrasonic waves. For example, when an actual frequency response value is low compared to the standard frequency response value of the mobile device, the transmission strength may be increased such that the actual frequency response value is increased.

In the method 100, by determining a standard frequency response value for each microphone by measurement, one of the at least two microphones which has a highest frequency response value may be determined as the microphone for receiving ultrasonic waves. Since a higher standard frequency response value indicates that when receiving the reflected ultrasonic wave the corresponding microphone has a smaller influence on the received ultrasonic wave, a preferred microphone may be selected, and the influence of microphone hardware conditions on receiving ultrasonic waves can be reduced.

It is to be noted that steps 101 to 103 may also be implemented separately as an individual embodiment. Under such circumstance, a preferred microphone is not selected for the mobile device before leaving the factory, and each microphone's standard frequency response value is determined respectively, such that the mobile device may determine a preferred microphone according to an actual environment when being operated.

Figure 2:
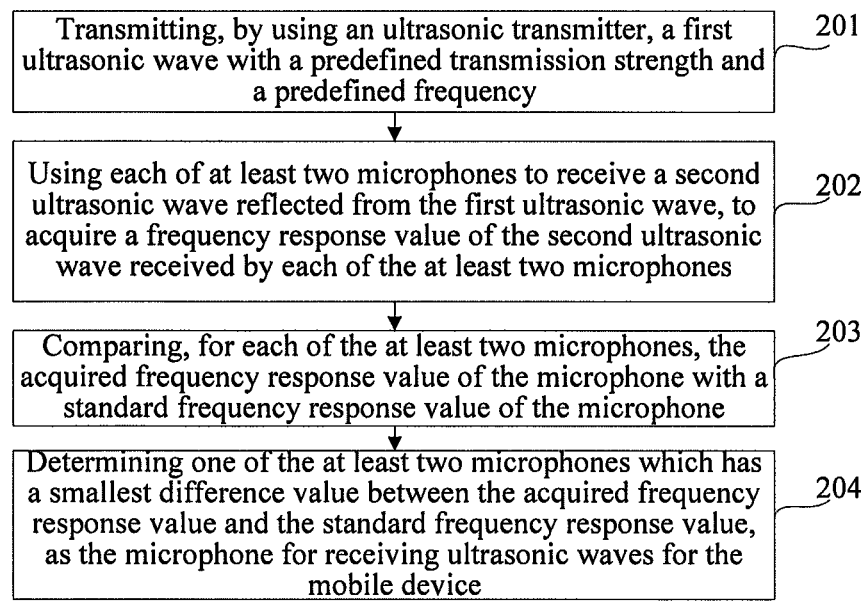
FIG. 2 is a flow chart of another method for microphone selection according to an exemplary embodiment.

FIG. 2 is a flow chart of a method 200 for microphone selection, according to an exemplary embodiment. For example, the method 200 may be applied in a mobile device having at least two microphones after the mobile device leaves a factory. Referring to FIG. 2, the method 200 includes the following steps.

In step 201, a first ultrasonic wave is transmitted, by using an ultrasonic transmitter, with a predefined transmission strength and a predefined frequency.

For example, the predefined transmission strength is set up before the mobile device leaves the factory, and the predefined frequency is also set up as a preferred frequency before leaving the factory.

In the exemplary embodiment, in order to be able to determine a currently most suitable microphone for receiving ultrasonic waves, the mobile device uses the ultrasonic transmitter to transmit the first ultrasonic wave with the predefined transmission strength and the predefined frequency.

Because the mobile device is currently in an environment in which the mobile device is operated, factors such as temperature, transmission medium density, ambient obstacles, etc., in the environment may affect an attenuation degree of transmitted ultrasonic waves. Combined with the influence of each microphone's hardware conditions on receiving ultrasonic waves, it is required in the exemplary embodiment to measure frequency response values of the reflected ultrasonic waves received by each microphone, and determine a microphone with a minimum attenuation as the preferred microphone.

It is to be noted that, the first ultrasonic wave in step 201 is an ultrasonic wave transmitted during an actual operational process of the mobile device, which is different from the first ultrasonic waves in step 101 (FIG. 1).

In step 202, each of the at least two microphones may be used to receive a second ultrasonic wave reflected from the first ultrasonic wave, to acquire a frequency response value of the second ultrasonic wave received by each of the at least two microphones.

In the exemplary embodiment, the mobile device uses the ultrasonic transmitter to transmit the first ultrasonic wave with the predefined transmission strength and the predefined frequency, and then uses each microphone to receive the second ultrasonic wave reflected back from the first ultrasonic wave.

In the exemplary embodiment, amplitudes of the second ultrasonic wave in each period may be affected by environmental factors. Furthermore, when a microphone receives the second ultrasonic wave and transmits information of the second ultrasonic wave to a processor of the mobile device, the amplitudes of the second ultrasonic wave may also be affected by hardware conditions of the microphone. Thus, with respect to the first ultrasonic wave having been transmitted, the mobile device acquires a frequency response value of the second ultrasonic wave received by each of the at least two microphones.

Similarly, for each of the at least two microphones, the highest amplitude of the second ultrasonic wave received by the microphone may be determined as the frequency response value of the second ultrasonic wave received by the microphone.

Due to the influence of each microphone, the frequency response value of the second ultrasonic wave received by each microphone may be different from each other.

It is to be noted that, the second ultrasonic wave in step 202 is an ultrasonic wave received during the actual operational process of the mobile device, which is different from the second ultrasonic waves in step 102 (FIG. 1).

In step 203, for each of the at least two microphones, the acquired frequency response value of the microphone is compared with a standard frequency response value of the microphone.

In the exemplary embodiment, the standard frequency response value of each microphone may be previously stored in the mobile device, as described above in steps 101 to 103 (FIG. 1).

In step 204, one of the at least two microphones which has a smallest difference value between the acquired frequency response value and the standard frequency response value may be determined as the microphone for receiving ultrasonic waves for the mobile device.

In an embodiment, the difference value may be obtained by subtracting the acquired frequency response value from the standard frequency response value of the microphone.

In the exemplary embodiment, a difference value may be obtained for each microphone of the mobile device. If a microphone has the smallest difference value, it indicates that the acquired frequency response value of the microphone is closest to the standard frequency response value of the microphone when the mobile device is operated. That is to say, the microphone has a minimum influence on the attenuation of the amplitude of ultrasonic waves. Thus, the microphone having the smallest difference value may be determined as the microphone for receiving ultrasonic waves.

In the method 200, the second ultrasonic wave reflected from the first ultrasonic wave is received by each of the at least two microphones, and the frequency response value of the second ultrasonic wave received by each of the at least two microphones is acquired. Thus, one of the at least two microphones which has the smallest difference value between the acquired frequency response value and the standard frequency response value may be determined as a preferred microphone. Since the smallest difference value between the acquired frequency response value and the standard frequency response value indicates being closest to a factory standard, the microphone may be determined as the preferred microphone.

It is to be noted that the method 100 (FIG. 1A) may be used to select a microphone for receiving ultrasonic waves and each microphone's standard frequency response value before the mobile device leaves the factory. If the microphone selected for receiving ultrasonic waves is damaged after the mobile device leaves the factory, the method 200 (FIG. 2) may then be used to re-select a microphone for receiving ultrasonic waves.

Figure 3A:
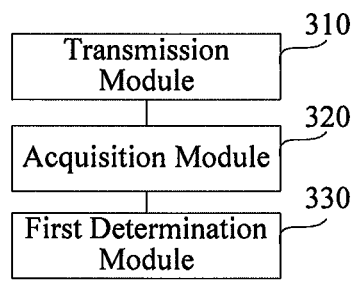
FIG. 3A is a block diagram of a device for microphone selection according to an exemplary embodiment.

FIG. 3A is a block diagram of a device 300 for microphone selection, according to an exemplary embodiment. For example, the device 300 may be applied in a mobile device having at least two microphones. Referring to FIG. 3, the device 300 includes, but is not limited to, a transmission module 310, an acquisition module 320, and a first determination module 330.

The transmission module 310 is configured to transmit, by using an ultrasonic transmitter of the mobile device, first ultrasonic waves within a testing box, wherein the first ultrasonic waves are transmitted with a predefined transmission strength and at different frequencies selected from a predefined frequency range.

The acquisition module 320 is configured to acquire, by using each of the at least two microphones to receive second ultrasonic waves reflected from the first ultrasonic waves within the testing box, frequency response values of the second ultrasonic waves received by the at least two microphones.

The first determination module 330 is configured to determine one of the at least two microphones which has a highest frequency response value, as the microphone for receiving ultrasonic waves.

Figure 3B:
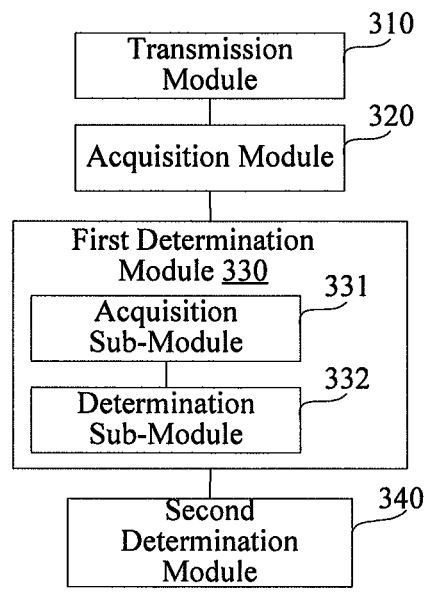
FIG. 3B is a block diagram of another device for microphone selection according to an exemplary embodiment.

In exemplary embodiments, shown in FIG. 3B, the first determination module 330 may further include an acquisition sub-module 331 and a determination sub-module 332.

The acquisition sub-module 331 is configured to acquire a highest frequency response value for each of the at least two microphones and determine the highest frequency response value for each of the at least two microphones as a standard frequency response value of the microphone.

The determination sub-module 332 is configured to determine one of the at least two microphones which has the highest standard frequency response value as the microphone for receiving ultrasonic waves.

In some embodiments, the acquisition sub-module 331 is further configured to: for each of the at least two microphones, compare the frequency response values of the second ultrasonic waves received by the microphone and select a highest frequency response value of the second ultrasonic waves as the highest frequency response value of the microphone (i.e., the standard frequency response value of the microphone), wherein different second ultrasonic waves correspond to different frequencies.

In an embodiment, the device 300 may further include a second determination module 340. The second determination module 340 is configured to determine a frequency corresponding to the highest standard frequency response value as a predefined frequency of the mobile device and determine the highest standard frequency response value as a standard frequency response value of the mobile device.

Figure 4A:
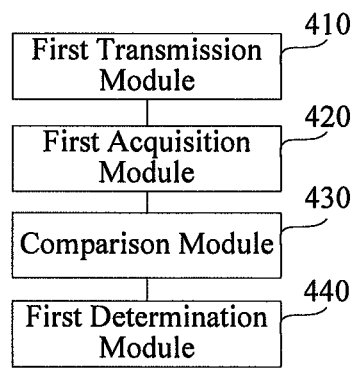
FIG. 4A is a block diagram of yet another device for microphone selection according to an exemplary embodiment.

FIG. 4A is a block diagram of a device 400 for microphone selection, according to an exemplary embodiment. For example, the device 400 may be applied in a mobile device having at least two microphones. Referring to FIG. 4, the device 400 includes, but is not limited to, a first transmission module 410, a first acquisition module 420, a comparison module 430, and a first determination module 440.

The first transmission module 410 is configured to transmit, by using an ultrasonic transmitter of the mobile device, a first ultrasonic wave with a predefined transmission strength and a predefined frequency.

In the exemplary embodiment, the predefined transmission strength is set up before the mobile device leaves the factory, and the predefined frequency is also set up as a preferred frequency before the mobile device leaves the factory.

The first acquisition module 420 is configured to acquire, by using each of the at least two microphones to receive a second ultrasonic wave reflected from the first ultrasonic wave that is transmitted by the first transmission module 410, a frequency response value of the second ultrasonic wave received by each of the at least two microphones.

The comparison module 430 is configured to compare, for each of the at least two microphones, the frequency response value of the microphone acquired by the first acquisition module 420 with a standard frequency response value of the microphone.

The first determination module 440 is configured to select of the at least two microphones which has a smallest difference value between the acquired frequency response value and the standard frequency response value, as the microphone for receiving ultrasonic waves.

Figure 4B:
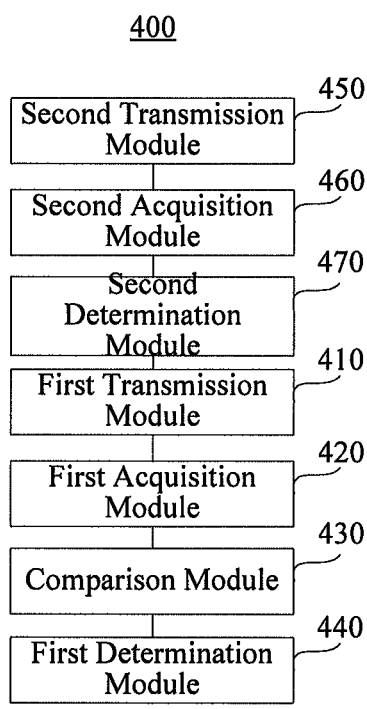
FIG. 4B is a block diagram of yet another device for microphone selection according to an exemplary embodiment.

In exemplary embodiments, shown in FIG. 4B, the device 400 further includes a second transmission module 450, a second acquisition module 460, and a second determination module 470.

The second transmission module 450 is configured to transmit, by using the ultrasonic transmitter of the mobile device, third ultrasonic waves within a testing box, wherein the third ultrasonic waves are transmitted with a predefined transmission strength and at different frequencies selected from a predefined frequency range.

The second acquisition module 460 is configured to acquire, by using each of the at least two microphones to receive fourth ultrasonic waves reflected from the third ultrasonic waves within the testing box, frequency response values of the fourth ultrasonic waves received by each of the at least two microphones.

The second determination module 470 is configured to acquire a highest frequency response value for each of the at least two microphones based on the frequency response values acquired by the second acquisition module 460 and determine the highest frequency response value for each of the at least two microphones as the standard frequency response value of the microphone.

In an exemplary embodiment, there is provided a device for microphone selection, which is enabled to implement the microphone selection methods described in the present disclosure. The device may be applied in a mobile device having at least two microphones. The device for microphone selection may include a processor and a memory for storing instructions executable by the processor.

The processor is configured to: transmit, by using an ultrasonic transmitter of the mobile device, first ultrasonic waves within a testing box, wherein the first ultrasonic waves are transmitted with a predefined transmission strength and at different frequencies selected from a predefined frequency range; acquire, by using each of the at least two microphones to receive second ultrasonic waves reflected from the first ultrasonic waves within the testing box, frequency response values of the second ultrasonic waves received by each of the at least two microphones; and select one of the at least two microphones which has a highest frequency response value, as the microphone for receiving ultrasonic waves.

Figure 5:
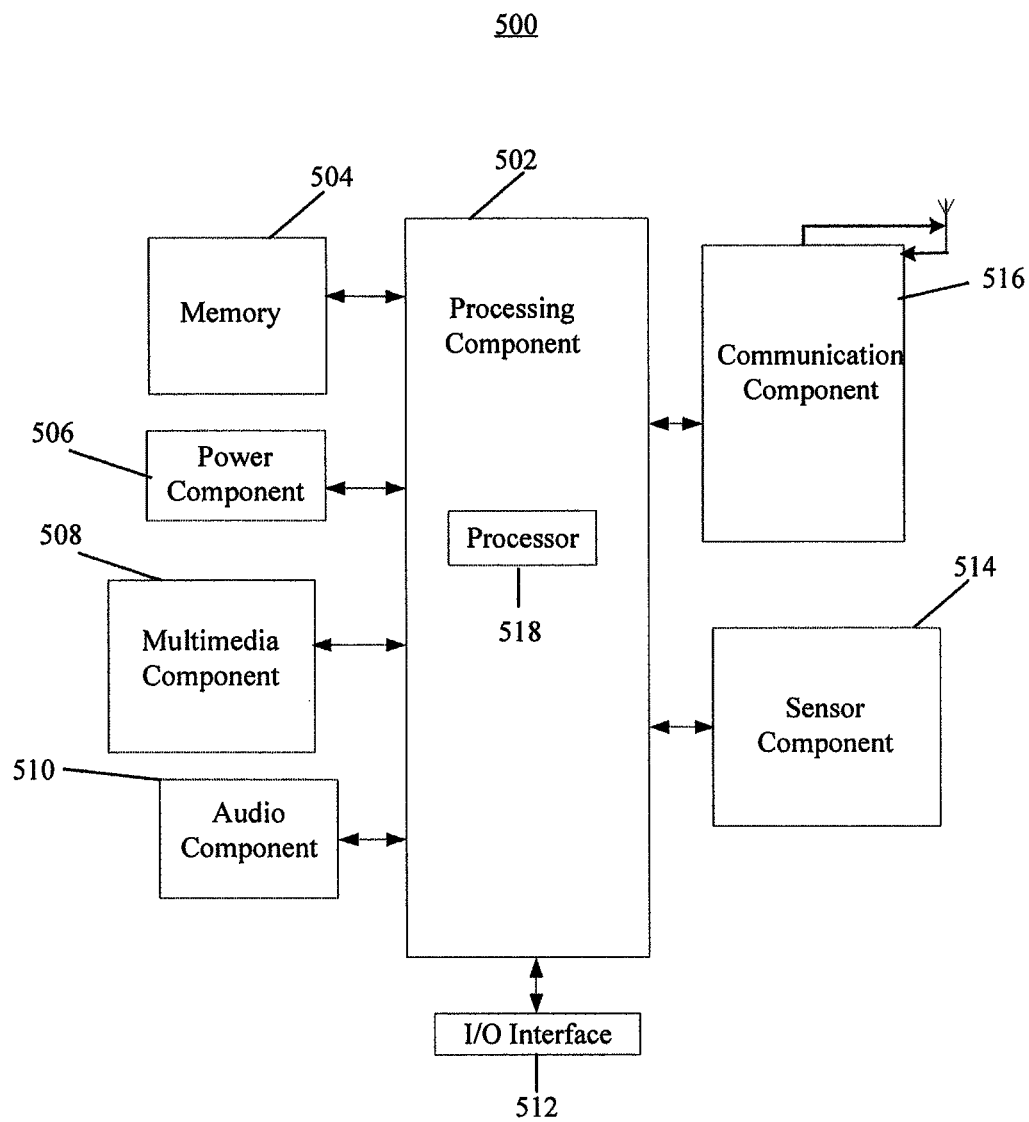
FIG. 5 is a block diagram of another device for microphone selection according to an exemplary embodiment.

FIG. 5 is a block diagram of a device 500 for microphone selection, according to an exemplary embodiment. For example, the device 500 may be a mobile device capable of transmitting ultrasonic waves. The device 500 may include a mobile phone, a tablet device, a wearable device, a handset, a computer, a digital broadcast terminal, a messaging device, a gaming console, a medical device, exercise equipment, a personal digital assistant, or the like.

Referring to FIG. 5, the device 500 may include one or more of the following components: a processing component 502, a memory 504, a power component 506, a multimedia component 508, an audio component 510, an input/output (I/O) interface 512, a sensor component 514, and a communication component 516.

The processing component 502 typically controls overall operations of the device 500, such as the operations associated with display, telephone calls, data communications, camera operations, and recording operations. The processing component 502 may include one or more processors 518 to execute instructions to perform all or part of the steps in the above described methods. Moreover, the processing component 502 may include one or more modules which facilitate the interaction between the processing component 502 and other components. For instance, the processing component 502 may include a multimedia module to facilitate the interaction between the multimedia component 508 and the processing component 502.

The memory 504 is configured to store various types of data to support the operation of the device 500. Examples of such data include instructions for any applications or methods operated on the device 500, contact data, phonebook data, messages, pictures, video, etc. The memory 504 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 506 provides power to various components of the device 500. The power component 506 may include a power management system, one or more power sources, and any other components associated with the generation, management, and distribution of power in the device 500.

The multimedia component 508 includes a screen providing an output interface between the device 500 and the user. In some embodiments, the screen may include a liquid crystal display (LCD) and a touch panel. If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some embodiments, the multimedia component 508 includes a front camera and/or a rear camera. The front camera and the rear camera may receive an external multimedia datum while the device 500 is in an operation mode, such as a photographing mode or a video mode. Each of the front camera and the rear camera may be a fixed optical lens system or have focus and optical zoom capability.

The audio component 510 is configured to output and/or input audio signals. For example, the audio component 510 includes a microphone configured to receive an external audio signal when the device 500 is in an operation mode, such as a call mode, a recording mode, and a voice recognition mode. The received audio signal may be further stored in the memory 504 or transmitted via the communication component 516. In some embodiments, the audio component 510 further includes a speaker to output audio signals. In some embodiments, the audio component 510 includes at least two microphones.

The I/O interface 512 provides an interface between the processing component 502 and peripheral interface modules, such as a keyboard, a click wheel, buttons, and the like. The buttons may include, but are not limited to, a home button, a volume button, a starting button, and a locking button.

The sensor component 514 includes one or more sensors to provide status assessments of various aspects of the device 500. For instance, the sensor component 514 may detect an open/closed status of the device 500, relative positioning of components, e.g., the display and the keypad, of the device 500, a change in position of the device 500 or a component of the device 500, a presence or absence of user contact with the device 500, an orientation or an acceleration/deceleration of the device 500, and a change in temperature of the device 500. The sensor component 514 may include a proximity sensor configured to detect the presence of nearby objects without any physical contact. The sensor component 514 may also include a light sensor, such as a CMOS or CCD image sensor, for use in imaging applications. In some embodiments, the sensor component 514 may also include an accelerometer sensor, a gyroscope sensor, a magnetic sensor, a pressure sensor, or a temperature sensor.

The communication component 516 is configured to facilitate communication, wired or wirelessly, between the device 500 and other devices. The device 500 can access a wireless network based on a communication standard, such as WiFi, 2 G, 3 G, or 4 G, or a combination thereof. In one exemplary embodiment, the communication component 516 receives a broadcast signal or broadcast associated information from an external broadcast management system via a broadcast channel. In one exemplary embodiment, the communication component 516 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 500 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods for microphone selection.

In exemplary embodiments, there is also provided a non-transitory computer-readable storage medium including instructions, such as included in the memory 504, executable by the processor 518 in the terminal device 500, for performing the above-described methods for microphone selection. For example, the non-transitory computer-readable storage medium may be a ROM, a RAM, a CD-ROM, a magnetic tape, a floppy disc, an optical data storage device, and the like.

One of ordinary skill in the art will understand that the above described modules can each be implemented by hardware, or software, or a combination of hardware and software. One of ordinary skill in the art will also understand that multiple ones of the above described modules may be combined as one module, and each of the above described modules may be further divided into a plurality of sub-modules.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. The specification and embodiments are merely considered to be exemplary and the substantive scope and spirit of the disclosure is limited only by the appended claims.

It will be appreciated that the inventive concept is not limited to the exact construction that has been described above and illustrated in the accompanying drawings, and that various modifications and changes can be made without departing from the scope thereof. It is intended that the scope of the invention only be limited by the appended claims.

What is claimed is:

1. A method for microphone selection, applied in a mobile device having at least two microphones, the method comprising:

transmitting, by using an ultrasonic transmitter of the mobile device, first ultrasonic waves within a testing box, wherein the first ultrasonic waves are transmitted with a predefined transmission strength and at different frequencies selected from a predefined frequency range;

acquiring, by using each of the at least two microphones configured to receive second ultrasonic waves resulting from reflection of the first ultrasonic waves within the testing box, frequency response values of the second ultrasonic waves received by each of the at least two microphones, wherein for each second ultrasonic wave resulting from reflection of a respective first ultrasonic wave of a respective frequency selected from the predefined frequency range, a frequency response value of the second ultrasonic wave received by each of the at least two microphones is a highest amplitude received by the microphone within periods of the second ultrasonic wave of the respective frequency;

acquiring, for each of the at least two microphones, a highest frequency response value by comparing the frequency response values of the second ultrasonic waves of the different frequencies received by the microphone and determining a highest frequency response value as the highest frequency response value of the microphone;

determining the highest frequency response value for each of the at least two microphones, as a standard frequency response value of the each of the at least two microphones; and determining one of the at least two microphones which has a highest standard frequency response value as a microphone for receiving ultrasonic waves during subsequent operations of the mobile device.

2. The method of claim 1, wherein the determining the highest frequency response value for each of the at least two microphones comprises:

for each of the at least two microphones, comparing the frequency response values of the second ultrasonic waves received by the each of the at least two microphones and determining a highest frequency response value as the highest frequency response value of the each of the at least two microphones, wherein different second ultrasonic waves correspond to different frequencies.

3. The method of claim 1, further comprising:

determining a frequency corresponding to a highest one of the standard frequency response values of the at least two microphones as a predefined frequency of the mobile device, and determining the highest one of the standard frequency response values as a standard frequency response value of the mobile device.

4. A method for microphone selection, applied in a mobile device having at least two microphones, the method comprising:

transmitting, by using an ultrasonic transmitter of the mobile device, a first ultrasonic wave with a predefined transmission strength and a predefined frequency;

acquiring, by using each of the at least two microphones to receive a second ultrasonic wave reflected from the first ultrasonic wave with the predefined frequency, a frequency response value of the second ultrasonic wave received by each of the at least two microphones, wherein the frequency response value of the second ultrasonic wave received by each of the at least two microphones is a highest amplitude received by the microphone within periods of the second ultrasonic wave of the predefined frequency;

comparing, for each of the at least two microphones, the acquired frequency response value of the each of the at least two microphones with a standard frequency response value of the each of the at least two microphones; and determining one of the at least two microphones which has a smallest difference value between the acquired frequency response value and the standard frequency response value, as a microphone for receiving ultrasonic waves during subsequent operations of the mobile device.

5. The method of claim 4, further comprising:

transmitting, by using the ultrasonic transmitter, third ultrasonic waves within a testing box, wherein the third ultrasonic waves are transmitted with the predefined transmission strength and at different frequencies selected from a predefined frequency range;

acquiring, by using each of the at least two microphones to receive fourth ultrasonic waves reflected from the third ultrasonic waves within the testing box, frequency response values of the fourth ultrasonic waves received by each of the at least two microphones; and acquiring a highest frequency response value for each of the at least two microphones, and determining the highest frequency response value for each of the at least two microphones as the standard frequency response value of the each of the at least two microphones.

6. A mobile device, comprising:

a processor;

at least two microphones coupled to the processor; and a memory for storing instructions executable by the processor, wherein the processor is configured to:

transmit, by using an ultrasonic transmitter of the mobile device, first ultrasonic waves within a testing box, wherein the first ultrasonic waves are transmitted with a predefined transmission strength and at different frequencies selected from a predefined frequency range;

acquire, by using each of the at least two microphones configured to receive second ultrasonic waves resulting from reflection of the first ultrasonic waves within the testing box, frequency response values of the second ultrasonic waves received by the at least two microphones, wherein for each second ultrasonic wave resulting from reflection of a respective first ultrasonic wave of a respective frequency selected from the predefined frequency range, a frequency response value of the second ultrasonic wave received by each of the at least two microphones is a highest amplitude received by the microphone within periods of the second ultrasonic wave of the respective frequency;

acquire, for each of the at least two microphones, a highest frequency response value by comparing the frequency response values of the second ultrasonic waves of the different frequencies received by the microphone and determining a highest frequency response value as the highest frequency response value of the microphone;

determine the highest frequency response value for each of the at least two microphones, as a standard frequency response value of the each of the at least two microphones; and determine one of the at least two microphones which has a highest standard frequency response value, as a microphone for receiving ultrasonic waves during subsequent operations of the mobile device.

7. The mobile device of claim 6, wherein the processor is further configured to:

for each of the at least two microphones, compare the frequency response values of the second ultrasonic waves received by the each of the at least two microphones and determine a highest frequency response value as the highest frequency response value of the each of the at least two microphones, wherein different second ultrasonic waves correspond to different frequencies.

8. The mobile device of claim 6, wherein the processor is further configured to:

determine a frequency corresponding to a highest one of the standard frequency response values of the at least two microphones as a predefined frequency of the mobile device, and determine the highest one of the standard frequency response values as a standard frequency response value of the mobile device.

9. A non-transitory computer-readable storage medium having stored therein instructions that, when executed by a processor, cause the processor to perform a method according to claim 1.

* * * * *